United States Patent
Sakamoto

(10) Patent No.: US 9,438,914 B2
(45) Date of Patent: Sep. 6, 2016

(54) ENCODING APPARATUS AND ENCODING METHOD

(71) Applicant: CANON KABUSHIKI KAISHA, Tokyo (JP)

(72) Inventor: Daisuke Sakamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 91 days.

(21) Appl. No.: 14/516,288

(22) Filed: Oct. 16, 2014

(65) Prior Publication Data

US 2015/0110410 A1  Apr. 23, 2015

(30) Foreign Application Priority Data

Oct. 17, 2013  (JP) .................................. 2013-216756

(51) Int. Cl.

| G06K 9/36 | (2006.01) |
|---|---|
| H04N 19/103 | (2014.01) |
| H04N 19/117 | (2014.01) |
| H04N 19/182 | (2014.01) |
| H04N 19/136 | (2014.01) |
| H04N 19/98 | (2014.01) |
| H04N 19/46 | (2014.01) |
| H04N 19/96 | (2014.01) |

(52) U.S. Cl.
CPC .......... *H04N 19/103* (2014.11); *H04N 19/117* (2014.11); *H04N 19/136* (2014.11); *H04N 19/182* (2014.11); *H04N 19/98* (2014.11); H04N 19/46 (2014.11); H04N 19/96 (2014.11)

(58) Field of Classification Search
CPC ....... G06T 5/001; G06T 9/004; G06T 9/008; H04N 19/00; H04N 19/103; H04N 19/105; H04N 19/10; H04N 19/117; H04N 19/119; H04N 19/136; H04N 19/14; H04N 19/17; H04N 19/157; H04N 19/159; H04N 19/176; H04N 19/182; H04N 19/44; H04N 19/463; H04N 19/51; H04N 19/513; H04N 19/577; H04N 19/593; H04N 19/61; H04N 19/70; H04N 19/82; H04N 19/85; H04N 19/86; H04N 19/98

See application file for complete search history.

(56) References Cited

U.S. PATENT DOCUMENTS

| 6,195,464 B1 * | 2/2001 | Kondo ................. H04N 19/647 375/E7.049 |
|---|---|---|
| 8,995,776 B2 * | 3/2015 | Ikai ......................... G06T 5/001 382/224 |

FOREIGN PATENT DOCUMENTS

JP  2012-005113 A  1/2012

\* cited by examiner

*Primary Examiner* — Jose Couso

(74) *Attorney, Agent, or Firm* — Cowan, Liebowitz & Latman, P.C.

(57) ABSTRACT

An encoding apparatus includes an encoding unit that encodes an image to be encoded; a generating unit that generates a local decoded image from the encoded image; a difference calculation unit that calculates difference values between pixels included in the local decoded image and pixels included in the image to be encoded; and a modifying unit that determines pixels from the local decoded image based on the difference values, and modifies the determined pixels.

5 Claims, 10 Drawing Sheets

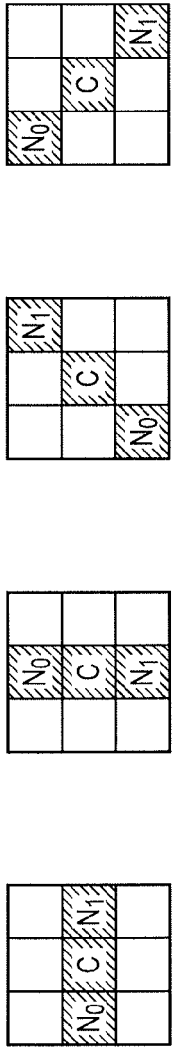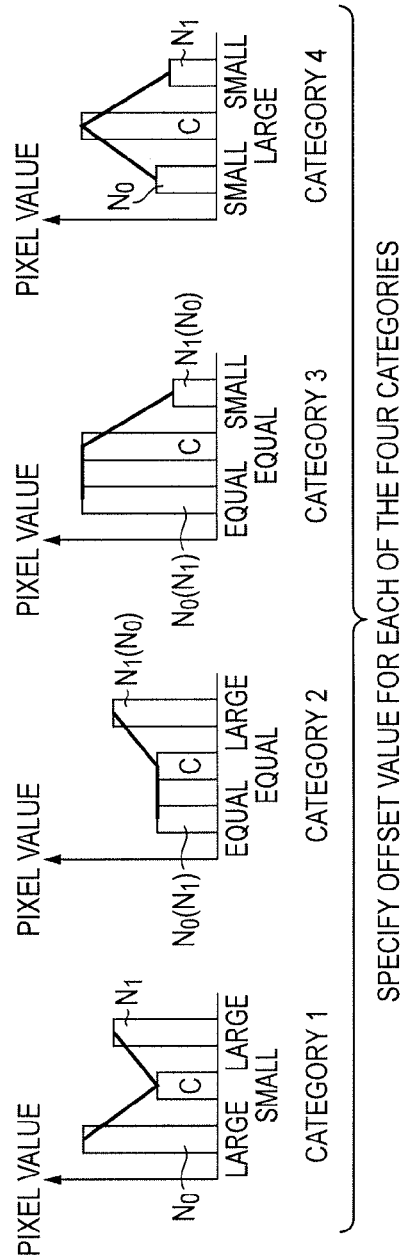
FIG. 4

ENCODING APPARATUS AND ENCODING METHOD

BACKGROUND

1. Field of the Invention

The present invention relates to an encoding apparatus and an encoding method.

2. Description of the Related Art

With the recent rapid development in digitization of information relating to the so-called multimedia such as audio signals and image signals, compression encoding/decoding techniques for image signals are gathering attention. The compression encoding/decoding techniques can reduce the storage capacity required for storage of image signals and the bandwidth required for transmission of image signals.

With a commonly used compression encoding/decoding technique, the information amount (data amount) is compressed by using a high degree of auto-correlation (i.e., redundancy) that many image signals have. The redundancy of an image signal includes time redundancy and two-dimensional space redundancy. Time redundancy can be reduced by using motion detection and motion compensation in units of blocks. On the other hand, space redundancy can be reduced by using discrete cosine transform (DCT).

The most efficient of the encoding methods using this technique that are currently used is H.264/MPEG-4 PART 10 (AVC) (hereinafter, referred to as "H.264"). However, there is currently an increasing need for an encoding method that provides an even higher compression ratio in order to, for example, compress a Super High Vision (SHV) image having a resolution 16 times that of a high vision image, or exchange an image having an even higher resolution in a limited transmission band. For this reason, studies have been conducted on improvements in encoding efficiency by Joint Collaboration Team-Video Coding (JCTVC), which is a joint standardization organization of ITU-T and ISO/IEC. As a result, an encoding method called High Efficiency Video Coding (HEVC) has been officially authorized by ITU-T in January, 2013.

HEVC is expected to have compression efficiency twice that of H.264. To achieve this compression efficiency, HEVC adopts various new techniques. Among them is an adaptive loop filter called Sample Adaptive Offset (SAO). The basic method of SAO is described in Japanese Patent Laid-Open No. 2012-005113. A more description of SAO in HEVC will be given below.

SAO is a technique intended to improve the image quality by determining whether a pixel to which a deblocking filter has been applied corresponds to conditions set in SAO, and adding an appropriate offset value to the pixel, thereby making the encoded image more similar to the original image. Two types of modes are defined as the SAO modes. In either mode, pixels are classified into five categories, and an offset value is set for each category. The process of adding or not adding an offset value is executed for each Coding Tree Unit (CTU).

Band Offset mode (hereinafter, referred to as "BO"), which is one of the SAO modes, will be described with reference to FIG. 3. In BO, pixel values from a minimum value (0 in FIG. 3) to a maximum value (255 in FIG. 3) are divided equally into 32 bands. For each pixel, an offset process is executed while switching the offset value according to the band to which the pixel belongs.

In BO, an offset value is added to pixels belonging to four consecutive bands of the 32 bands. In a CTU on which BO is executed, sao_band_position (a pixel value of 32 in FIG. 3), which indicates a band to which an offset is applied, is specified, and the four consecutive bands (a pixel value of 32 to a pixel value of 63 in FIG. 3) therefrom are specified as the four categories for which the offset is on. On the other hand, the other bands are categories for which the offset is off. Since BO modifies pixels having a value within a specific range, it is the mode in which modification effectively works particularly if the dispersion in the pixel values included in a CTU is small.

Next, Edge Offset mode (hereinafter, referred to as "EO"), which is the other SAO mode, will be described with reference to FIG. 4. In EO, pixels are classified into categories based on the magnitude relationship between the pixel value of a pixel within the CTU and the pixel values of neighboring pixels, as shown on the lower side of FIG. 4. As shown on the upper side of FIG. 4, four patterns are defined as the positions of the neighboring pixels used for comparison of the magnitude relationship. The encoding apparatus determines which of the four patterns is to be used. EO has the effect of modifying local peaks and valleys of pixel values such that they are smoothed. Thus, EO is the mode that works effectively to modify mosquito noise occurring near steep edges in the original image.

SAO can improve the image quality by making a decoded image similar to the original image by setting an appropriate offset value during encoding. However, if SAO fails to set the offset value appropriately, it may degrade the image quality on the contrary.

Japanese Patent Laid-Open No. 2012-005113 proposes, as the method for determining the offset value, a method that uses the difference between an average value of pixel values before encoding and an average value of pixel values after encoding (after local decoding). This method enables modification of average pixel values, and thus improves Peak signal-to-noise ratio (PSNR), thereby improving a basic image quality. Depending on the state of the pixel values after encoding, however, the method may not be able to sufficiently improve the image quality. With reference to FIGS. 5A and 5B, a description will be given of a case where the image quality cannot be improved sufficiently.

FIG. 5A shows pixel values of a CTU to be encoded and pixel values of a local decoded CTU after encoding and before execution of SAO process if the CTU size is 4×4, for example. In the example shown here, BO is applied as the SAO mode. Similar to FIG. 3, sao_band_position is set to start from a pixel value of 32, and all pixel values of the local decoded CTU belong to the Val1 category. In FIG. 5A, the difference between an average value of the pixel values before encoding and an average value of the pixel values after encoding is calculated to be a value of 2. Thus, in accordance with Japanese Patent Laid-Open No. 2012-005113, the offset value is 2.

FIG. 5B is a graphical representation in which a difference value between each pixel of the CTU after SAO process and the corresponding pixel of the CTU to be encoded if the offset value is set to 2 and a difference value between each pixel of the CTU before SAO process and the corresponding pixel of the CTU to be encoded are plotted in the raster order from the top left for comparison. In FIG. 5B, the closer the difference value approaches 0, the smaller the difference from the CTU to be encoded. Thus, it is shown that the image quality is improved. As can be seen from the difference values after SAO process, the addition of the offset value causes the difference value of many pixels, except for some pixels, to approach 0, indicating that the image quality is somewhat improved. However, most pixels still have a difference value of 3, and the difference in pixel value from the CTU to be encoded has not been eliminated yet.

SUMMARY OF THE DISCLOSURE

According to an aspect of the present invention, there is provided a novel technique for encoding an image.

According to another aspect of the present invention, there is provided an encoding apparatus comprising: an encoding unit that encodes an image to be encoded; a generating unit that generates a local decoded image from the encoded image; a difference calculation unit that calculates difference values between pixels included in the local decoded image and pixels included in the image to be encoded; and a modifying unit that determines pixels from the local decoded image based on the difference values, and modifies the determined pixels.

According to another aspect of the present invention, there is provided a method comprising: encoding an image to be encoded; generating a local decoded image from the encoded image; calculating difference values between pixels included in the local decoded image and pixels included in the image to be encoded; determining pixels from the local decoded image based on the difference values; and modifying the determined pixels.

Further features and aspects of the present invention will become apparent from the following description of exemplary embodiments.

BRIEF DESCRIPTION OF THE DRAWINGS

FIG. 4 is a diagram illustrating Edge Offset mode of SAO.

DESCRIPTION OF THE EMBODIMENTS

Exemplary embodiments of the present invention will be described with reference to the attached drawings.

First Exemplary Embodiment

Figure 2:
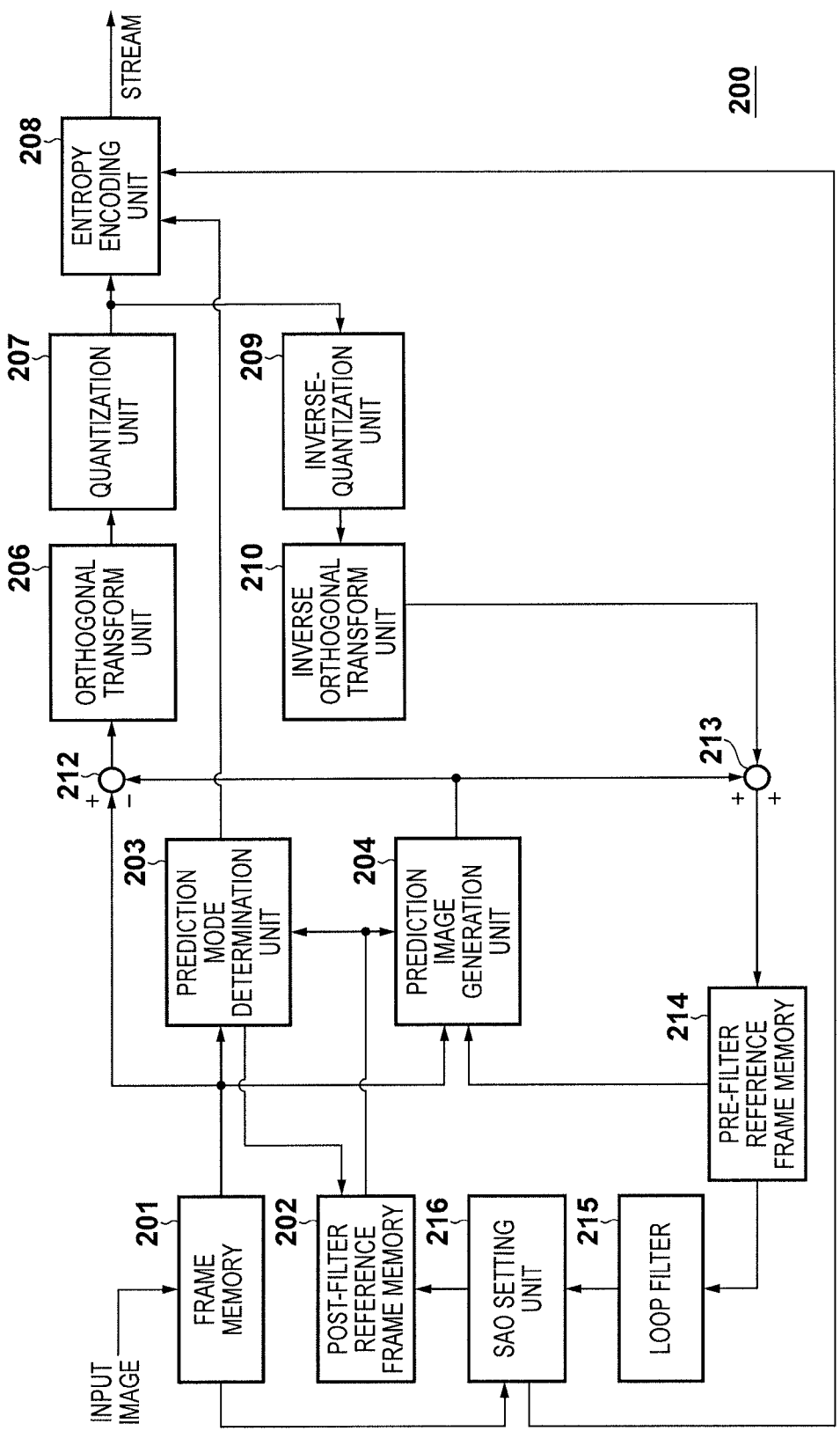
FIG. 2 is a block diagram illustrating a configuration of an image encoding apparatus 200 according to the first exemplary embodiment.

FIG. 2 is a block diagram illustrating a configuration of an image encoding apparatus 200 according to the first exemplary embodiment. As shown in FIG. 2, the image encoding apparatus 200 includes a frame memory 201, a post-filter reference frame memory 202, a prediction mode determination unit 203, a prediction image generation unit 204, an orthogonal transform unit 206, a quantization unit 207, and an entropy encoding unit 208. The image encoding apparatus 200 also includes an inverse quantization unit 209, an inverse orthogonal transform unit 210, a subtracter 212, an adder 213, a pre-filter reference frame memory 214, a loop filter 215, and an SAO setting unit 216.

A procedure by which the image encoding apparatus 200 encodes an input image will be described with reference to FIG. 2. Input images (original images) are saved in display order in the frame memory 201. Then, blocks to be encoded are transmitted in encoding order sequentially to the prediction mode determination unit 203, the prediction image generation unit 204, and the subtracter 212. A block to be encoded is, for example, a Coding Tree Unit (CTU) compliant with High Efficiency Video Coding (HEVC).

Encoded images that have been subjected to a SAO process after filtering are saved as reference images in the post-filter reference frame memory 202. Then, the reference images of the blocks to be encoded are transmitted in encoding order sequentially to the prediction mode determination unit 203 and the prediction image generation unit 204.

The subtracter 212 subtracts a prediction image block transmitted from the prediction image generation unit 204 from a block to be encoded transmitted from the frame memory 201, and outputs image residual data.

The orthogonal transform unit 206 performs an orthogonal transform process on the image residual data output from the subtracter 212, and transmits the transform coefficient to the quantization unit 207. The quantization unit 207 quantizes the transform coefficient transmitted from the orthogonal transform unit 206 by using a predetermined quantization parameter, and transmits the quantized transform coefficient to the entropy encoding unit 208 and the inverse quantization unit 209.

The entropy encoding unit 208 receives input of the transform coefficient quantized by the quantization unit 207 and SAO parameters, which will be described later, transmitted from the SAO setting unit 216, performs entropy encoding such as CABAC thereon, and outputs the resultant as encoded data.

Next, a description will be given of the procedure by which reference image data (pre-filter reference image data and post-filter reference image data) is generated using the transform coefficient quantized by the quantization unit 207. The inverse quantization unit 209 dequantizes the quantized transform coefficient transmitted from the quantization unit 207. The inverse orthogonal transform unit 210 inversely orthogonally transforms the transform coefficient dequantized by the inverse quantization unit 209 to generate decoded residual data, and transmits it to the adder 213.

The adder 213 adds the decoded residual data to prediction image data, which will be described later, to generate reference image data (pre-filter reference image data), and saves it in the pre-filter reference frame memory 214. The pre-filter reference image data is also transmitted to the loop filter 215. The loop filter 215 filters the pre-filter reference image data to remove the noise, and transmits the post-filter reference image data to the SAO setting unit 216. Thereby, the local decoded image obtained by compression encoding and decoding the blocks to be encoded is input into the SAO setting unit 216.

The SAO setting unit 216 performs a sample adaptive offset (SAO) process, and saves the reference image data that has been subjected to SAO process in the post-filter reference frame memory 202. Note that the method for determining the offset value for SAO process (SAO offset value) will be described in detail later.

Next, a description will be given of the procedure by which prediction image data is generated using the above-described input image data, pre-filter reference image data, and post-filter reference image data. The prediction mode determination unit 203 determines the prediction mode for the block to be encoded, based on the block to be encoded transmitted from the frame memory 201 and the post-filter reference image data transmitted from the post-filter reference frame memory 202. Then, the prediction mode determination unit 203 transmits the determined prediction mode to the prediction image generation unit 204, together with the number of the post-filter reference image data.

The prediction image generation unit 204 generates prediction image data. At that time, based on the prediction mode transmitted from the prediction mode determination unit 203, the prediction image generation unit 204 determines whether to refer to the reference image data in the post-filter reference frame memory 202 or to use the decoded pixels around the block to be encoded transmitted from the pre-filter reference frame memory 214. After generating the prediction image data, the prediction image generation unit 204 transmits the prediction image data to the subtracter 212.

Figure 3:
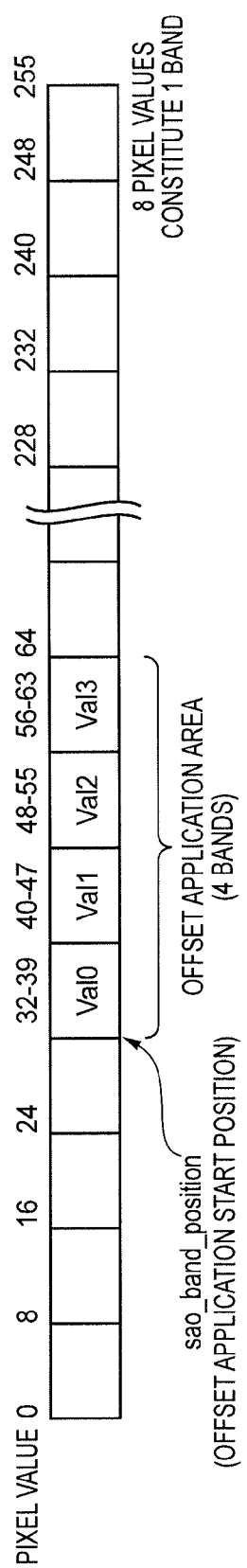
FIG. 3 is a diagram illustrating Band Offset mode of SAO.

Next, a description will be given of the method for determining the SAO offset value in the SAO setting unit 216 with reference to the block diagram (FIG. 1) of the SAO setting unit 216, the diagram of BO (FIG. 3), the diagram of EO (FIG. 4), and the flowchart of FIG. 6, FIG. 7, and FIGS. 8A and 8B.

Figure 1:
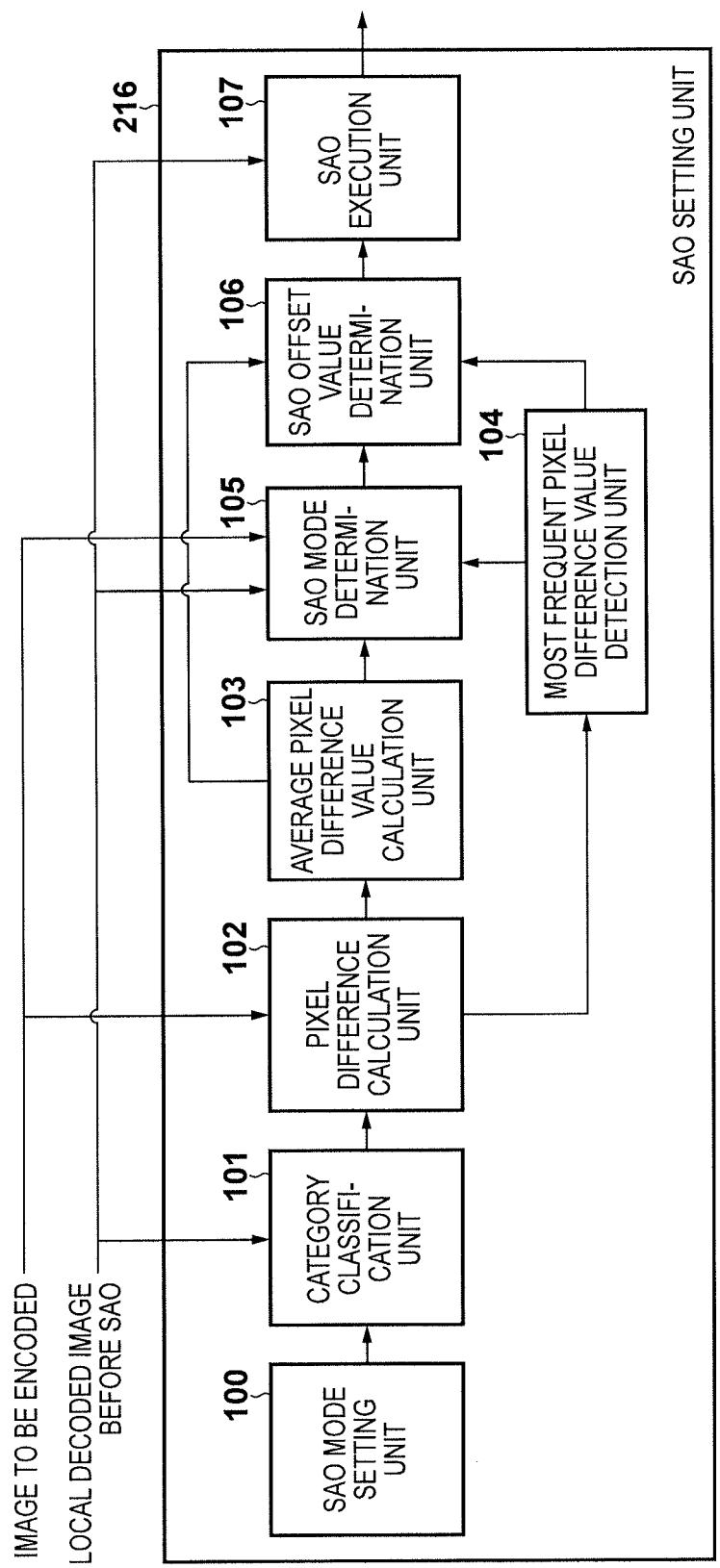
FIG. 1 is a block diagram of an SAO setting unit 216 according to a first exemplary embodiment.

As shown in FIG. 1, the SAO setting unit 216 includes an SAO mode setting unit 100, a category classification unit 101, a pixel difference calculation unit 102, an average pixel difference value calculation unit 103, a most frequent pixel difference value detection unit 104, and an SAO mode determination unit 105. The SAO setting unit 216 also includes an SAO offset value determination unit 106 and an SAO execution unit 107.

Figure 6:
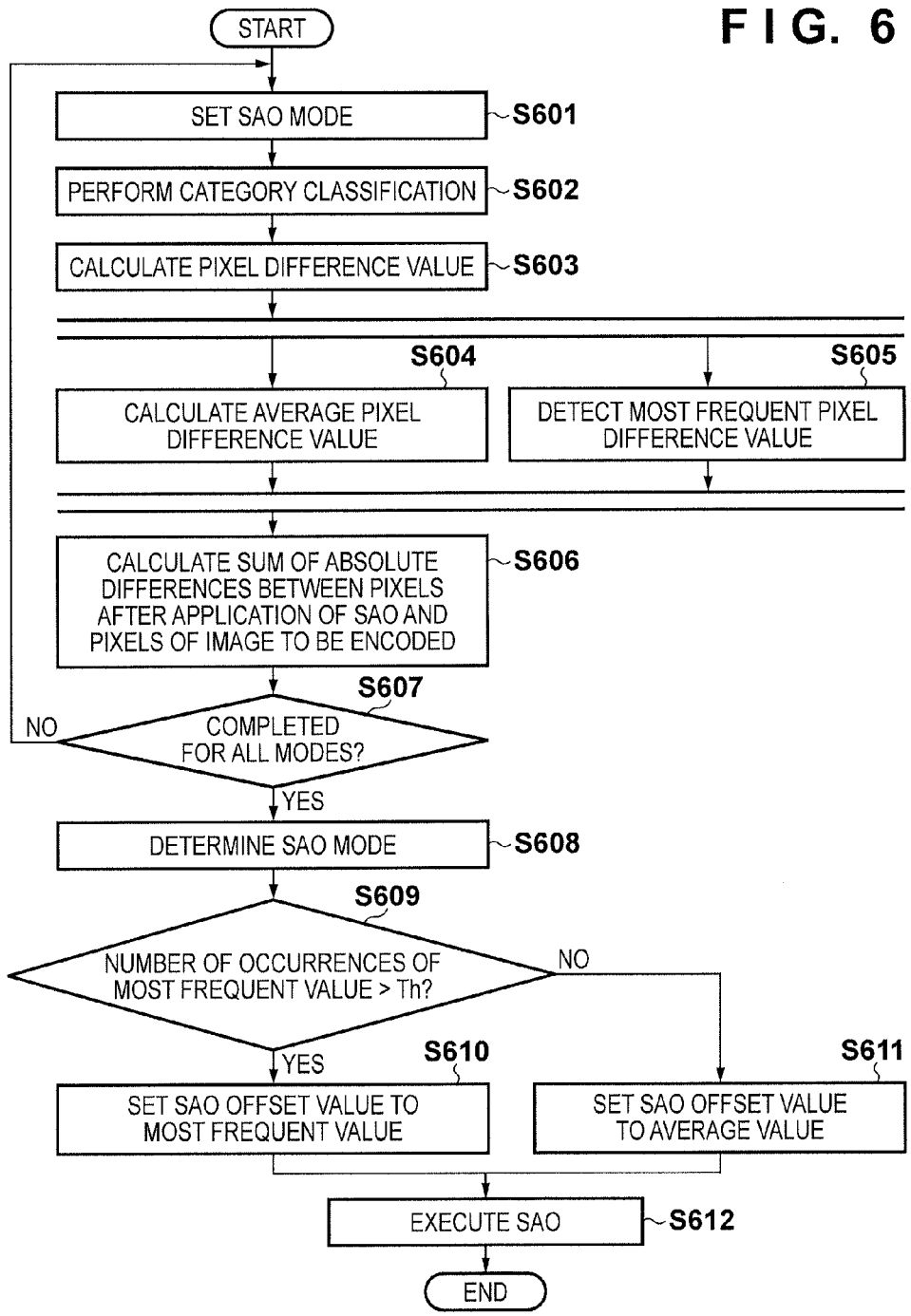
FIG. 6 is a flowchart illustrating a process executed by the SAO setting unit 216 according to the first exemplary embodiment.

FIG. 6 is a flowchart illustrating a process executed by the SAO setting unit 216. At step S601, the SAO mode setting unit 100 sets BO shown in FIG. 3 or one of the four different edges of BO shown on the upper side of FIG. 4, and transmits the mode to the category classification unit 101. Note that as a result of the process returning from step S607, which will be described later, to step S601, all modes are sequentially set in step S601.

At step S602, the category classification unit 101 performs classification to determine to which category each pixel of the post-filter reference image data (local decoded image) input from the loop filter 215 corresponds, in accordance with the mode set by the SAO mode setting unit 100. That is, the category classification unit 101 performs classification to determine to which of the bands (categories) shown in FIG. 3 the pixel belongs in the case of BO, and to which of the categories shown on the lower side of FIG. 4 the pixel belongs (or does not belong) in the case of BO. Note that in the case of BO, the category classification unit 101 does not set sao_band_position at this point, and performs classification to determine which (sub-range) of the 32 bands (in FIG. 3, pixel values in the range from 0 to 255) each pixel belongs to. After performing the category classification, the category classification unit 101 transmits the local decoded image to the pixel difference calculation unit 102.

At step S603, the pixel difference calculation unit 102 calculates the pixel difference values for each category by using the local decoded image transmitted from the category classification unit 101 and the image to be encoded transmitted from the frame memory 201. The difference values calculated for each category are transmitted to the average pixel difference value calculation unit 103 and the most frequent pixel difference value detection unit 104.

At step S604, the average pixel difference value calculation unit 103 calculates an average value of the pixel difference values for each category by using the pixel difference values transmitted from the pixel difference calculation unit 102. This calculation is performed on a category-by-category basis, for example, by dividing a sum of the pixel difference values by the number of the pixel difference values. The calculated average pixel difference value is transmitted to the SAO mode determination unit 105.

At step S605, the most frequent pixel difference value detection unit 104 checks the pixel difference values for each category, and counts the number of occurrences of each pixel difference value. Then, the most frequent pixel difference value detection unit 104 detects the number of the corresponding pixels for each category, the most frequent pixel difference value, and the number of occurrences of the most frequent pixel difference value, and transmits them to the SAO offset value determination unit 106.

At step S606, the SAO mode determination unit 105 performs temporary SAO process on the local decoded image input from the loop filter 215 by using, as the SAO offset value for each category, the average pixel difference value for each category transmitted from the average pixel difference value calculation unit 103. Note that if the mode set by the SAO mode setting unit 100 is BO, the SAO mode determination unit 105 first calculates a value obtained by multiplying the number of occurrences of the pixel difference value for each category that is counted by the most frequent pixel difference value detection unit 104 by the average pixel difference value for each category. Subsequently, a sum of the values calculated for four consecutive bands is determined. The starting point of the four consecutive bands for which the sum is the largest is set as sao_band_position, and SAO is applied. After generating a local decoded image to which SAO has been applied, the SAO mode determination unit 105 determines a difference between each pixel of the local decoded image and the corresponding pixel of the image to be encoded transmitted from the frame memory 201, calculates a sum of absolute differences, and holds the sum of absolute differences for each SAO mode.

At step S607, whether the process from steps S601 to S606 has been completed for all SAO modes (one BO mode, four BO modes) is determined. If it has not been completed, the process returns to step S601. If it has been completed, the process proceeds to step S608.

At step S608, the SAO mode determination unit 105 determines the mode for which the sum of absolute differences is the smallest to be the final SAO mode, based on the sums of absolute differences of the modes calculated in step S606, and notifies the determined mode to the SAO offset value determination unit 106.

At step S609, the SAO offset value determination unit 106 sets a threshold $Th_{cat}$ in each category based on the number of the corresponding pixels for each category in the determined SAO mode, and compares the threshold $Th_{cat}$ with the number of occurrences of the most frequent value $Cnt_{fre}$. Then, if $Cnt_{fre}$ is greater than the threshold (if $Cnt_{fre} > Th_{cat}$ is satisfied), the SAO offset value determination unit 106 adopts, at step S610, the most frequent value as the SAO offset value in that category. On the other hand, if $\text{Cnt}_{fre}$ is less than or equal to the threshold (if $\text{Cnt}_{fre} \leq \text{Th}_{cat}$ is satisfied), the SAO offset value determination unit 106 adopts, at step S611, the average pixel difference value as the SAO offset value in that category. The adopted offset value is notified to the SAO execution unit 107.

At step S612, the SAO execution unit 107 applies SAO process (modification of each pixel) to the local decoded image before SAO process by using the SAO mode determined at step S608 and the offset value determined at step S610 or step S611. Then, the SAO execution unit 107 saves the local decoded image that has been subjected to SAO process in the post-filter reference frame memory 202. Further, the SAO execution unit 107 transmits the SAO parameters (the SAO mode and the offset value) used for SAO process to the entropy encoding unit 208 in order to encode the SAO parameters.

Note that at step S609, the threshold $\text{Th}_{cat}$ in each category is determined using the number $\text{Cnt}_{cat}$ of pixels corresponding to each category and a coefficient α, as represented in Equation (1) below.

$$\text{Th}_{cat} = \text{Cnt}_{cat} \times \alpha \quad (\alpha \text{ is a real number of 0 to 1}) \qquad (1)$$

Figure 7:
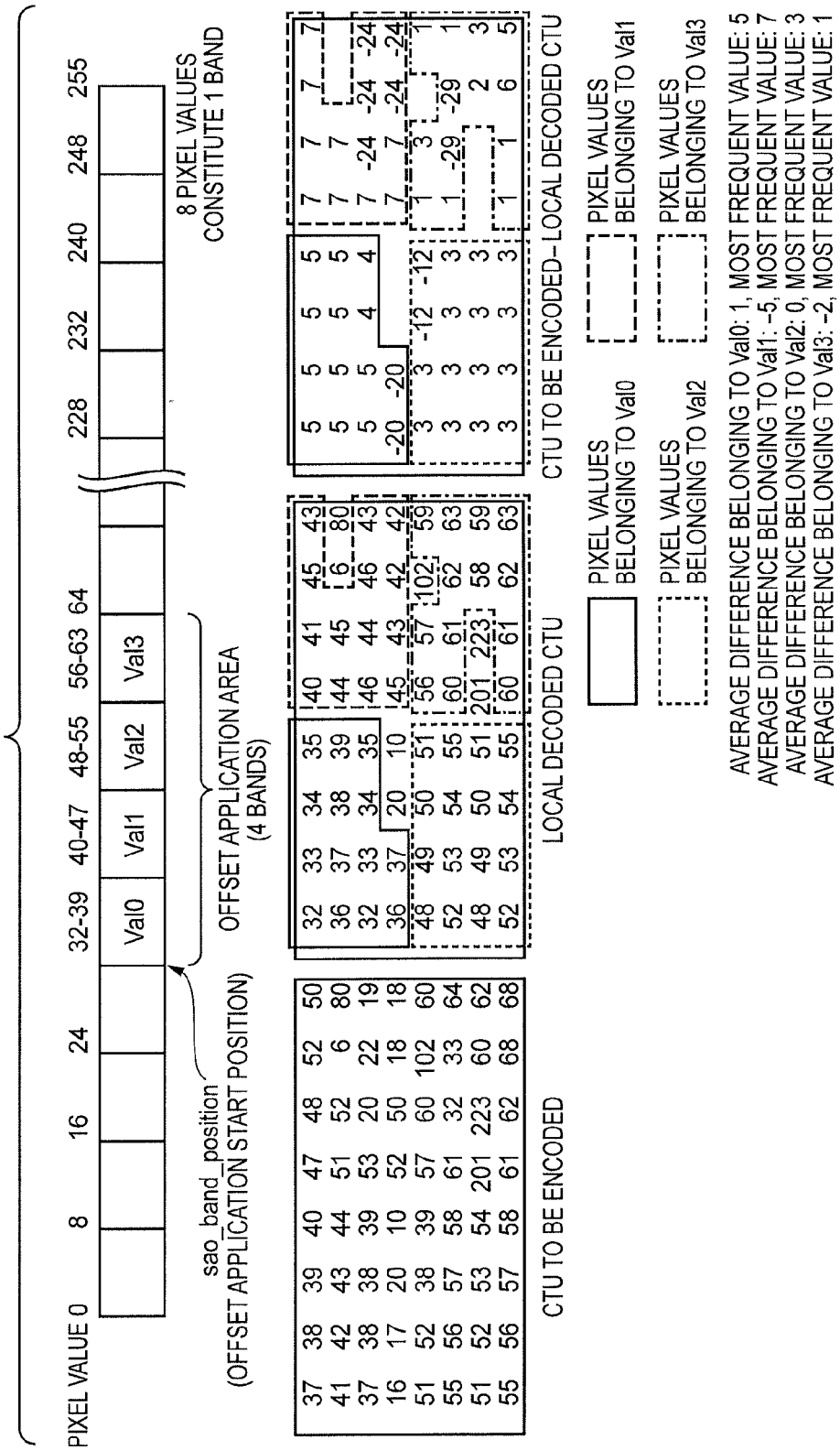
FIG. 7 is a diagram illustrating an example of a method for determining an SAO offset value.

Here, the method for determining the SAO offset value in each category will be described by way of an example shown in FIG. 7. In this example, it is assumed that BO is selected as the SAO mode and the band to which SAO is applied is set to four bands of pixel values of 32 to 63. However, the basic concept is also applicable to the other SAO modes. FIG. 7 shows the pixel values of the CTU to be encoded, the pixel values of the local decoded CTU (before SAO), and the pixel difference value between the CTU to be encoded and the local decoded CTU (before SAO) for each category if the CTU size is 32×32.

In FIG. 7, the number of pixels corresponding to the Val0 (pixel values of 32 to 39) category is 14. The number of pixels corresponding to the Val1 (pixel values of 40 to 47) category is 14, and the number of pixels corresponding to the Val2 (pixel values of 48 to 55) category is 16. The number of pixels corresponding to the Val3 (pixel values of 56 to 63) category is 13. The number of pixels that do not belong to any category is 7. Thus, the pixels of the local decoded CTU are classified into four pixel groups respectively corresponding to Val0 to Val3, and one pixel group that does not correspond to any of Val0 to Val3.

Here, the threshold $\text{Th}_{cat}$ is set to 70% of the number of pixels corresponding to each category. In other words, whether or not the ratio of the number of occurrences of the most frequent value to the number of pixels corresponding to each category exceeds 70% is the criterion. In this case, the coefficient α is set to 0.7, and the $\text{Th}_{cat}$ set for each category is determined as follows.

$\text{Th}_{cat}$ for Val0: 14×0.7=9

$\text{Th}_{cat}$ for Val1: 14×0.7=9

$\text{Th}_{cat}$ for Val2: 16×0.7=11

$\text{Th}_{cat}$ for Val3: 13×0.7=9

In the Val0 category, the most frequent value is 5 and it occurs 10 times, so that the number of occurrences of the most frequent value $\text{Cnt}_{fre}$ is 10. Likewise, in the Val1 category, the most frequent value is 7 and it occurs 9 times, so that the number of occurrences of the most frequent value $\text{Cnt}_{fre}$ is 9. In the Val2 category, the most frequent value is 3 and it occurs 14 times, so that the number of occurrences of the most frequent value $\text{Cnt}_{fre}$ is 14. In the Val3 category, the most frequent value is 1 and it occurs 6 times, so that the number of occurrences of the most frequent value $\text{Cnt}_{fre}$ is 6.

Accordingly, $\text{Th}_{cat}$ and $\text{Cnt}_{fre}$ in each category are compared, and the SAO offset value is determined. In the Val0 category, $\text{Th}_{cat}$ is 9 and $\text{Cnt}_{fre}$ is 10. Since $\text{Cnt}_{fre}$ is greater, the offset value is set to 5, which is the most frequent value. On the other hand, in the Val1 category, $\text{Th}_{cat}$ is 9 and $\text{Cnt}_{fre}$ is 9. Since $\text{Cnt}_{fre}$ is not greater than $\text{Th}_{cat}$, the offset value is set to −5, which is the average difference value. Likewise, in the Val2 category, $\text{Th}_{cat}$ is 11 and $\text{Cnt}_{fre}$ is 14. Since $\text{Cnt}_{fre}$ is greater, the offset value is set to 3, which is the most frequent value. In the Val3 category, $\text{Th}_{cat}$ is 9 and $\text{Cnt}_{fre}$ is 6. Since $\text{Cnt}_{fre}$ is smaller, the offset value is set to −2, which is the average difference value.

As described above, if the number of occurrences of the most frequent value is large, the image quality can be expected to be improved by using the most frequent value as the SAO offset value because the difference from the image to be encoded is eliminated in a larger number pixels. On the other hand, if the number of occurrences of the most frequent value is small, the image quality can be expected to be improved by using the average difference value because the difference between the pixel values after SAO process and the pixel values of the image to be encoded approaches 0 on the average.

Figure 5:
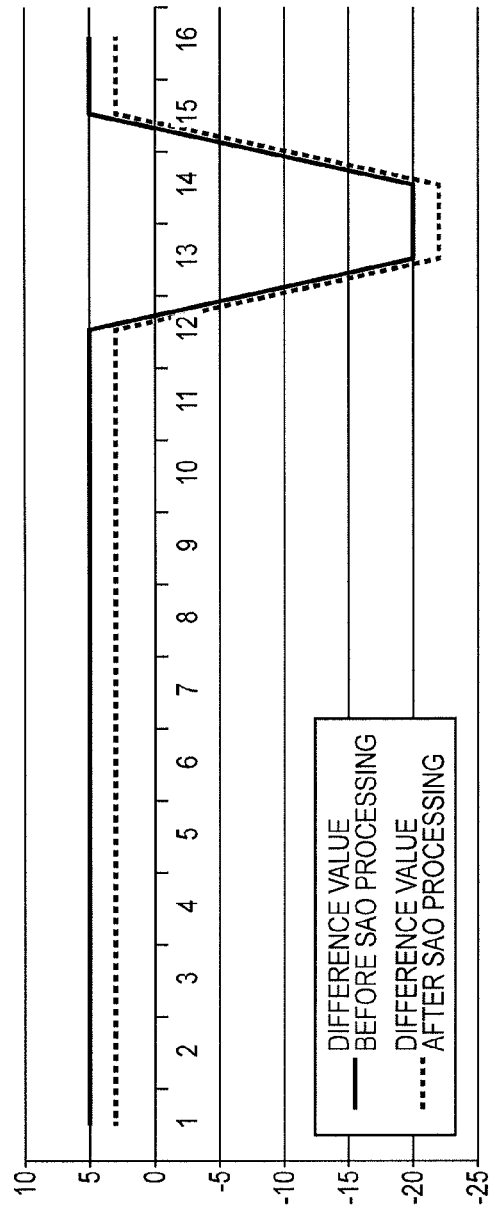
FIGS. 5A and 5B are diagrams illustrating problems of a conventional SAO.
Figure 8:
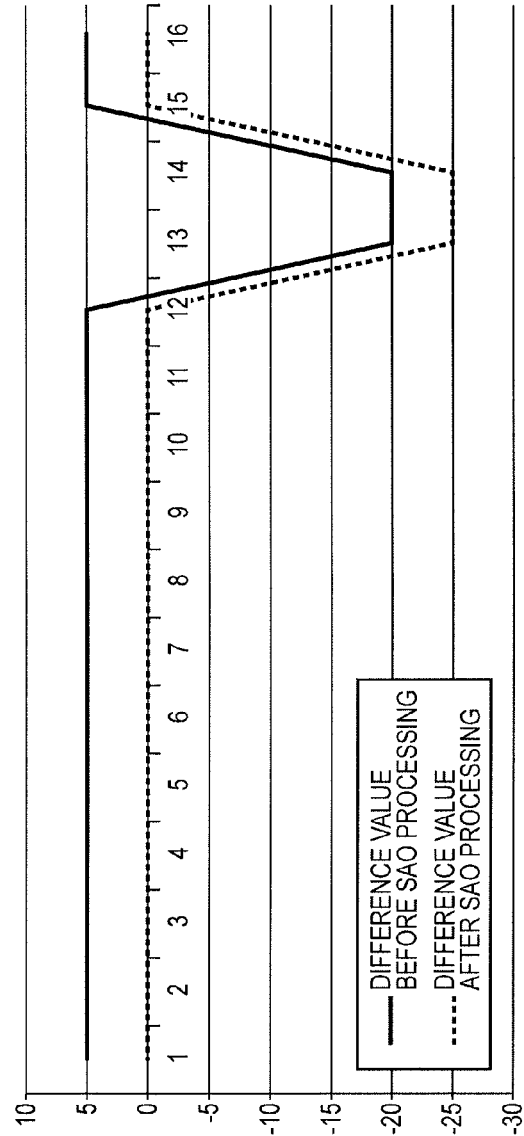
FIGS. 8A and 8B are diagrams illustrating how difference values between a CTU to be encoded and a local decoded CTU approach 0 as a result of SAO process according to the first exemplary embodiment.

With reference to FIGS. 8A and 8B, a description will be given of how the difference values between the CTU to be encoded and the local decoded CTU approach 0 as a result of the SAO process according to the first exemplary embodiment. As with FIG. 5A, FIG. 8A shows the pixel values of the CTU to be encoded and the pixel values of the local decoded CTU before being subjected to SAO process if the CTU size is 4×4. It is assumed that the SAO mode is BO, sao_band_position is set to a pixel value of 32, and all pixel values of the local decoded CTU belong to the Val1 category. In this case, the offset value for Val1 is set to 5, which is the most frequent difference value.

FIG. 8B is a graphical representation in which a difference value between each pixel of the CTU after SAO process and the corresponding pixel of the CTU to be encoded if the offset value is set to 5 and a difference value between each pixel of the CTU before SAO process and the corresponding pixel of the CTU to be encoded are plotted in the raster order from the top left for comparison. In FIG. 8B, the difference value is 0 for many of the pixels, unlike FIG. 5B.

The first exemplary embodiment has described, as an example of the method for determining the SAO mode, the method for which the mode in which the sum of absolute differences between the local decoded image and the image to be encoded if temporary SAO process is performed is the smallest is determined as the SAO mode. However, the first exemplary embodiment is not limited to this method. As an alternative method, it is possible to use, for example, a method in which a cost calculated to take the encoding amount of the SAO parameters into consideration is added to the sum of absolute differences between the local decoded image and the image to be encoded if temporary SAO process is performed, and the mode for which the cost is the smallest is selected.

In the first exemplary embodiment, the SAO setting unit 216 detects the most frequent pixel difference value on a category-by-category basis. However, the most frequent value may be detected from the difference values of all pixels of the local decoded image without classifying the pixels into categories. The method in which the most frequent value is detected without classifying pixels into categories can be expected to work efficiently especially if BO is applied to a flat image in which the irregularity in the difference values does not become large.

Although the SAO setting unit 216 counts only the most frequent value for each category if counting the number of occurrences of the most frequent value $\text{Cnt}_{fre}$ in the first exemplary embodiment, the SAO setting unit 216 may perform counting with a margin by using a plurality of values around the most frequent value. This will be described with reference to FIG. 7. Here, as an example, not only the most frequent value, but also three values around the most frequent value are used when counting $\text{Cnt}_{fre}$. In this case, pixel values of 4 to 6 are to be counted if counting $\text{Cnt}_{fre}$ of the pixels belonging to Val0. Likewise, pixel values of 6 to 8 are to be counted if counting the $\text{Cnt}_{fre}$ of the pixels belonging to Val1, and the pixel values of 2 to 4 are to be counted if counting $\text{Cnt}_{fre}$ of the pixels belonging to Val2. Pixel values of 0 to 2 are to be counted if counting the $\text{Cnt}_{fre}$ of the pixels belonging to Val3. Accordingly, $\text{Cnt}_{fre}$ in Val1 and Val2 remains unchanged, but $\text{Cnt}_{fre}$ in Val0 is changed to 12. Also, $\text{Cnt}_{fre}$ in Val3 is changed to 7.

As described thus far, according to the first exemplary embodiment, the image encoding apparatus 200 sets the offset value for SAO process to the most frequent value of the difference values between the pixels of the CTU to be encoded and the corresponding pixels of the CTU before SAO process, under a certain condition. This makes it possible to improve the image quality of a decoded image.

Second Exemplary Embodiment

Next, a description will be given of a second exemplary embodiment with reference to FIGS. 9 and 10. The second exemplary embodiment is similar to the first exemplary embodiment with regard to the configuration of the image encoding apparatus 200 (see FIG. 2), but is slightly different from the first exemplary embodiment with regard to the configuration and operation of the SAO setting unit 216.

Figure 9:
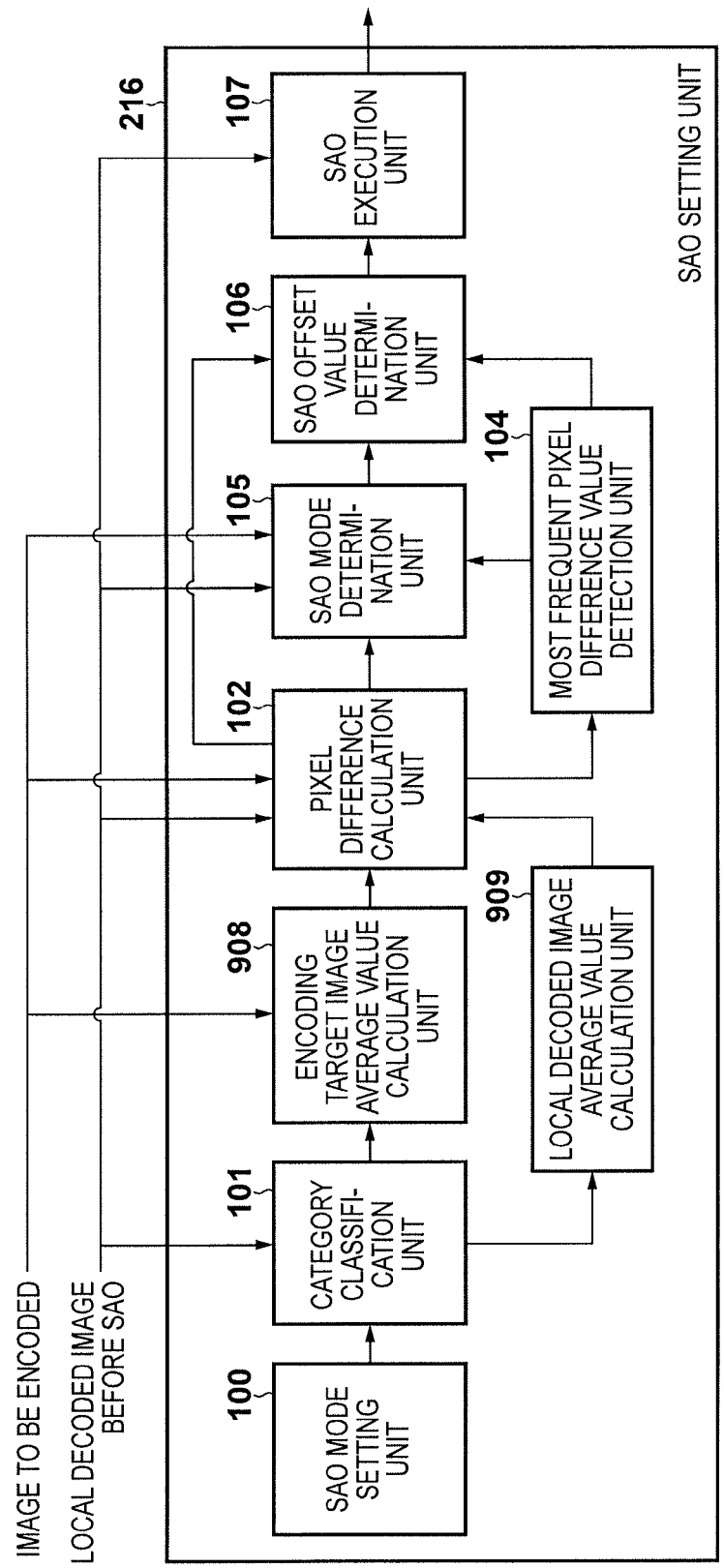
FIG. 9 is a block diagram of an SAO setting unit 216 according to a second exemplary embodiment.

FIG. 9 is a block diagram of an SAO setting unit 216 according to the second exemplary embodiment. Blocks in FIG. 9 that have functions that are the same or similar to those in FIG. 1 are denoted by the same reference numerals as those in FIG. 1, and the description thereof has been omitted. As shown in FIG. 9, the SAO setting unit 216 includes an encoding target image average value calculation unit 908 and a local decoded image average value calculation unit 909. The functions of these blocks will be described with reference to FIG. 10.

Figure 10:
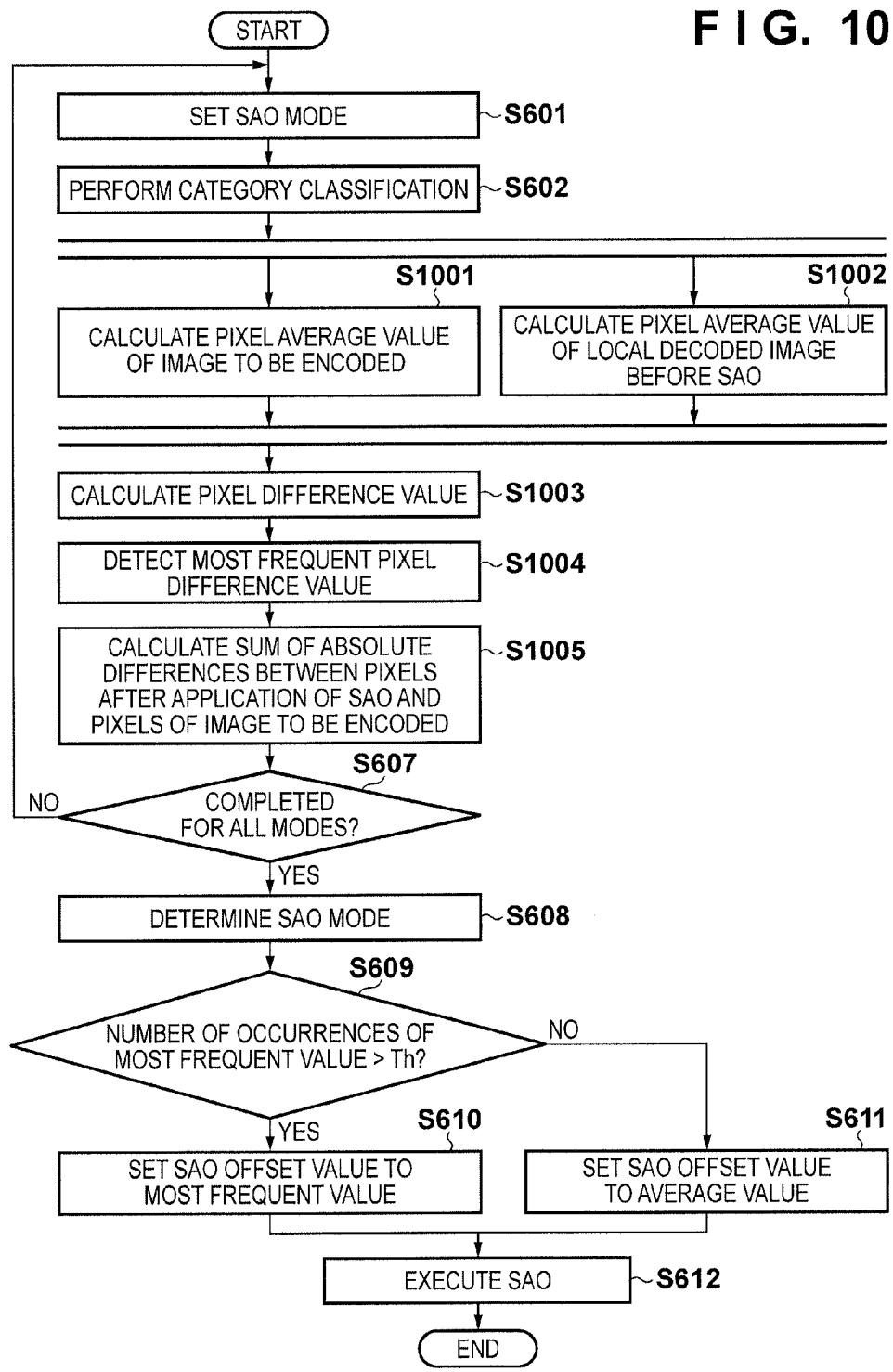
FIG. 10 is a flowchart illustrating a process executed by the SAO setting unit 216 according to the second exemplary embodiment.

FIG. 10 is a flowchart illustrating a process executed by the SAO setting unit 216 according to the second exemplary embodiment. In FIG. 10, steps that perform a process that is the same or similar to those in FIG. 6 are denoted by the same reference numerals as those in FIG. 6, and the description thereof has been omitted.

At step S1001, the encoding target image average value calculation unit 908 calculates an average values of pixels for each category by using the image to be encoded transmitted from the frame memory 201 and the result of classification performed by the category classification unit 101. The encoding target image average value calculation unit 908 transmits the calculated average value for each category to the pixel difference calculation unit 102.

At step S1002, the local decoded image average value calculation unit 909 calculates an average value of pixels for each category by using the local decoded image before SAO process that is transmitted from the category classification unit 101 and the result of category classification. The local decoded image average value calculation unit 909 transmits the calculated average value for each category to the pixel difference calculation unit 102.

At step S1003, the pixel difference calculation unit 102 calculates the pixel difference value for each category by using the local decoded image transmitted from the category classification unit 101 and the image to be encoded transmitted from the frame memory 201. The pixel difference calculation unit 102 calculates a difference value between the category-specific pixel average values of the image to be encoded that are transmitted from the encoding target image average value calculation unit 908 and the category-specific pixel average values of the local decoded image that are transmitted from the local decoded image average value calculation unit 909. The difference values calculated for each category are transmitted to the most frequent pixel difference value detection unit 104. The difference values of the category-specific pixel average values are transmitted to the SAO mode determination unit 105.

At step S1004, the most frequent pixel difference value detection unit 104 checks the pixel difference values for each category, and counts the number of occurrences of each pixel difference value. Then, the most frequent pixel difference value detection unit 104 detects the number of the corresponding pixels for each category, the most frequent pixel difference value, and the number of occurrences of the most frequent pixel difference value, and transmits them to the SAO offset value determination unit 106.

A process at step S1005 is substantially the same as the process at step S606 (FIG. 6). Note, however, that at step S1005, the difference values of the category-specific pixel average values transmitted at step S1003 from the pixel difference calculation unit 102 are used as the offset values for the categories of SAO.

As described above, the calculation order in the second exemplary embodiment is different from that in the first exemplary embodiment. However, as with the first exemplary embodiment, the image encoding apparatus 200 sets the offset value for SAO process to the most frequent value of the difference values between the pixels of CTU before SAO process and the corresponding pixels of CTU to be encoded, under a certain condition. This makes it possible to improve the image quality of a decoded image.

Third Exemplary Embodiment

At least one of the various functions, processes, and methods described in the first and second exemplary embodiments can be achieved using a program. Hereinafter, in a third exemplary embodiment, a program for realizing at least one of the various functions, processes, and methods described in the first and second exemplary embodiments will be referred to as a "program X". Further, in the third exemplary embodiment, a computer for executing the program X will be referred to as a "computer Y". Examples of the computer Y include a personal computer, a microcomputer, and a central processing unit (CPU).

At least one of the various functions, processes, and methods described in the first and second exemplary embodiments can be realized by the computer Y executing the program X. In this case, the program X is supplied to the computer Y via a computer readable storage medium. A computer readable storage medium according to the third exemplary embodiment includes at least one of a hard disk device, a magnetic storage device, an optical storage device, a magneto-optical storage device, a memory card, a read only memory (ROM), and a random access memory (RAM).

Further, the computer readable storage medium according to the third exemplary embodiment is a non-transitory storage medium.

While the present invention is described with reference to exemplary embodiments, it is to be understood that the present invention is not limited to the exemplary embodiments. The scope of the following claims is to be accorded the broadest interpretation so as to encompass all modifications and equivalent structures.

This application claims the benefit of Japanese Patent Application No. 2013-216756, filed on Oct. 17, 2013, which is hereby incorporated by reference herein in its entirety.

What is claimed is:

1. An encoding apparatus comprising:
a processor; and
a memory storing a program which, when executed by the processor, causes the encoding apparatus to:
encode an image to be encoded;
generate a local decoded image from the encoded image;
calculate difference values between pixels included in the local decoded image and pixels included in the image to be encoded;
select one of the calculated difference values, wherein the selected difference value is a value which is most frequent in the calculated difference values; and
correct each pixel of the local decoded image based on the selected difference value.

2. The encoding apparatus according to claim 1, wherein the image to be encoded includes a Coding Tree Unit (CTU) compliant with High Efficiency Video Coding (HEVC) standard.

3. A method comprising:
encoding an image to be encoded;
generating a local decoded image from the encoded image;
calculating difference values between pixels included in the local decoded image and pixels included in the image to be encoded;
selecting one of the calculated difference values, wherein the selected difference value is a value which is most frequent in the calculated difference values; and
correcting each pixel of the local decoded image based on the selected difference value.

4. A non-transitory storage medium which stores a program for causing a computer to execute a method, the method comprising:
encoding an image to be encoded;
generating a local decoded image from the encoded image;
calculating difference values between pixels included in the local decoded image and pixels included in the image to be encoded;
selecting one of the calculated difference values, wherein the selected difference value is a value which is most frequent in the calculated difference values; and
correcting each pixel of the local decoded image based on the selected difference value.

5. The encoding apparatus according to claim 1, wherein the program is further configured to cause the encoding apparatus to:
calculate an average value of the calculated difference values; and
determine whether a number of values equal to the selected difference value in the calculated difference values is larger than a threshold,
wherein each pixel of the local decoded image is corrected based on the average value of the calculated difference values instead of the selected difference value if the number of values equal to the selected difference value is not larger than the threshold.

* * * * *